United States Patent [19]

Hall

[11] Patent Number: 5,991,618
[45] Date of Patent: Nov. 23, 1999

[54] METHOD AND SYSTEM FOR ESTIMATING A COMMUNICATION MODE QUALITY IN A WIRELESS COMMUNICATIONS SYSTEM

[75] Inventor: Scott Maurice Hall, Fort Worth, Tex.

[73] Assignee: Motorola, Inc., Schaumburg, Ill.

[21] Appl. No.: 09/087,029

[22] Filed: May 29, 1998

[51] Int. Cl.⁶ .................................................. H04B 1/74
[52] U.S. Cl. ........................ 455/425; 455/421; 455/445
[58] Field of Search .................................. 455/522, 506, 455/505, 504, 501, 437, 425, 423, 422, 67.5, 67.3, 67.1, 63, 13.4, 10, 9, 115; 370/318; 375/224, 227

[56] References Cited

U.S. PATENT DOCUMENTS

| | | | |
|---|---|---|---|
| 5,265,119 | 11/1993 | Gilhousen et al. | 370/335 |
| 5,361,402 | 11/1994 | Grube et al. | 455/67.1 |
| 5,446,756 | 8/1995 | Mallinckrodt | 375/200 |
| 5,465,399 | 11/1995 | Oberholtzet et al. | 455/69 |
| 5,491,837 | 2/1996 | Haartsen | 455/62 |
| 5,551,057 | 8/1996 | Mitra | 455/522 |
| 5,623,484 | 4/1997 | Muszynski | 370/335 |
| 5,640,691 | 6/1997 | Davis et al. | 455/126 |
| 5,687,171 | 11/1997 | Shin et al. | 370/335 |
| 5,845,212 | 12/1998 | Tanaka | 455/437 |
| 5,852,778 | 12/1998 | Labedz | 455/423 |

FOREIGN PATENT DOCUMENTS

WO 94/06218  3/1994  Sweden  ................. H04B 7/005

*Primary Examiner*—Wellington Chin
*Assistant Examiner*—Blane J. Jackson
*Attorney, Agent, or Firm*—L. Bruce Terry

[57] ABSTRACT

In a wireless communications system, a subscriber unit transmit power is determined. Thereafter, a power margin is determined by subtracting the subscriber unit transmit power from a maximum transmit power. In response to a current communication mode of the subscriber unit, a predetermined power margin requirement for the current communication mode, and the current power margin, a communication mode quality is estimated. Either the power margin or communication mode quality may be indicated at the subscriber unit, or reported to the infrastructure of the wireless communications system. In response to an unsatisfactory power margin or communication mode quality, the infrastructure may make adjustments to improve service.

20 Claims, 3 Drawing Sheets

METHOD AND SYSTEM FOR ESTIMATING A COMMUNICATION MODE QUALITY IN A WIRELESS COMMUNICATIONS SYSTEM

FIELD OF THE INVENTION

The present invention is related in general to wireless communications systems, and more particularly to an improved method and system for estimating a communication mode quality in a wireless communications system.

BACKGROUND OF THE INVENTION

For many wireless communication system operators, maintaining and optimizing the communications system performance is a constant challenge. Factors that affect communication system performance include placement of transmitters or receivers, adjustment of antennas, and the selection of various software parameters that control almost every aspect of the communications system operation. Wireless communication system operators frequently wish to optimize range or coverage area of the communication system, the capacity or number of users that may be served by the system, and the bandwidth efficiency or amount of data that may be transported in a unit of time.

For communication systems that are full-duplex, the operator must be concerned with optimizing two wireless channels or links: an uplink and a downlink, which may also be referred to as a forward channel and a reverse channel. In some systems, the forward channel and the reverse channel are separated in frequency such that the characteristics or quality of one channel is not necessarily the same as those of the other channel. Therefore, the task of optimizing the wireless communications system may include simultaneously optimizing both wireless links. In some communication systems, this may be made more difficult by the fact that metrics and measurement techniques exist for one link and not the other. Furthermore, various modes of operation in the subscriber unit may depend upon the quality of one link independent of the quality of the other. For example, in some systems, such as a code division multiple access (CDMA) system that uses power control in the subscriber units, the system capacity is more sensitive to the proper control of the reverse link than the control of the forward link. Therefore, when such a communication mode depends upon the quality of the link that is not measured in the communications system, erroneous assumptions about the quality of a link may be made, which may lead to assumptions as to whether or not certain other modes of operation are available to a subscriber unit.

Therefore, a need exists for an improved method and system for estimating a communication mode quality in a wireless communication system.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF THE INVENTION

Figure 1:
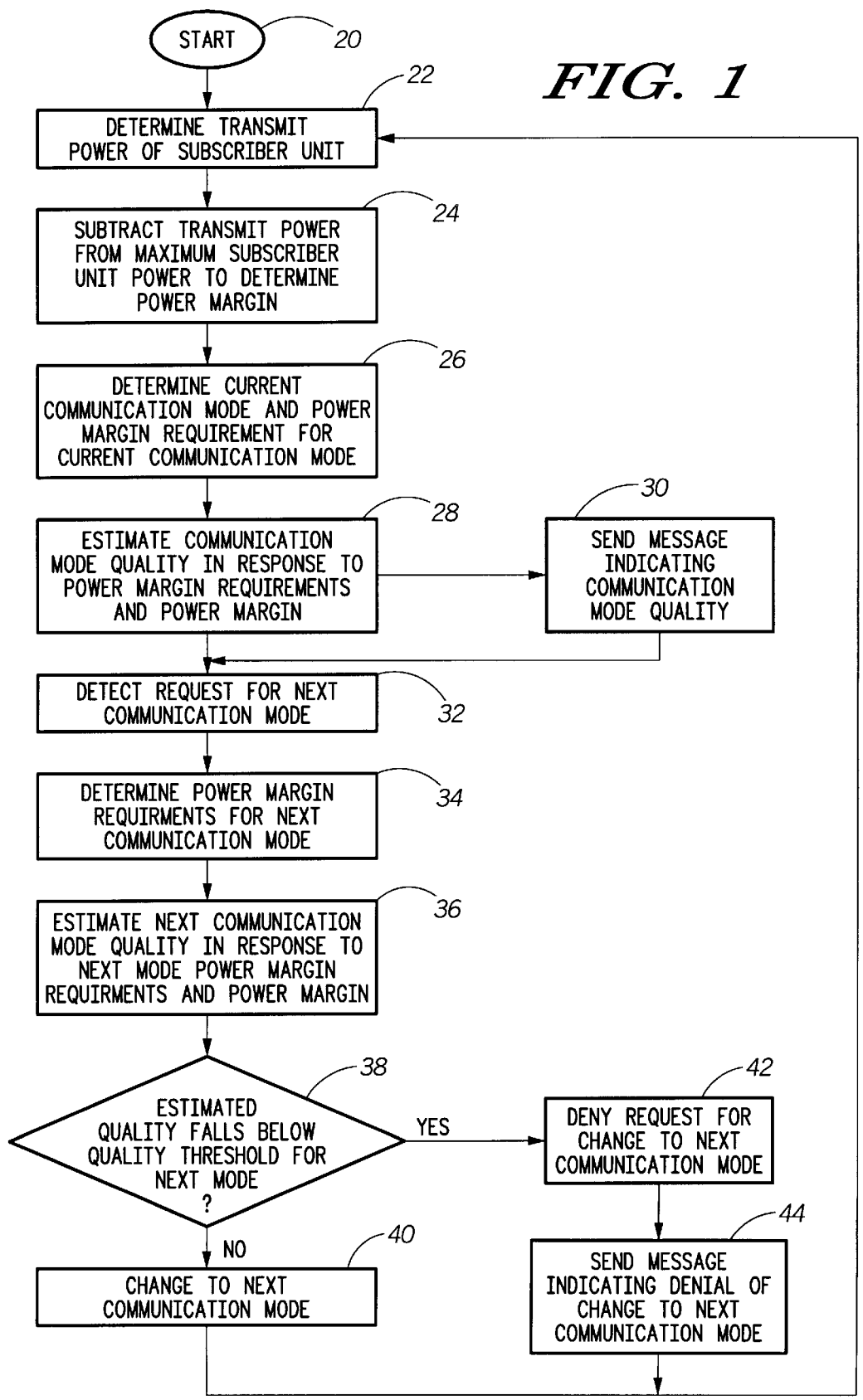
FIG. 1 depicts a high-level logic flowchart which illustrates the method and the operation of the system of the present invention.

With reference now to the figures, and in particular with reference to FIG. 1, there is depicted a high-level logic flowchart that illustrates the operation of the method and system in accordance with the present invention. As is shown, the process starts at block 20, and thereafter passes to block 22 wherein the system determines a current transmit power of the subscriber unit. With regard to this invention, the subscriber unit may be a mobile unit or a fixed wireless terminal, such as used in a wireless local loop communications system. This step may be implemented in several ways. For example, the output power of the subscriber unit power amplifier may be averaged during the time the transmitter is transmitting. Additionally, multiple transmitting periods may be averaged. In an alternative embodiment, the maximum power or peak power transmitted in a period may be used. Power measurements may be measured in dBm (Decibels referenced to 1 Miliwatt).

In another embodiment, the transmit power determination may be made indirectly by reading a control register in a power controller that sets or limits the output power of the subscriber unit's power amplifier. For example, in some subscriber units a value may be written into a power control register, which in turn sets automatic gain circuits and other control circuits in the power amplifier so that the output power is programmed by the variable in the power control register.

Next, the process determines a power margin by subtracting the current transmit power from a maximum subscriber unit transmit power, as illustrated at block 24. Note that the maximum subscriber unit transmit power may be a predetermined maximum power setting, which may be stored in software or hardware, or which may alternatively be the maximum subscriber unit transmit power limited by protection circuits and other controls designed to prevent amplifier overload. In some embodiments, the maximum subscriber unit transmit power may be set according to a preconfigured operating mode of the subscriber unit or according to a message received from the wireless communications system infrastructure.

After calculating the power margin, the process then determines the current communication mode and the power margin requirement for the current communication mode, as depicted at block 26. According to the present invention, a subscriber unit communication mode may be defined as a configuration of the subscriber unit that causes the subscriber unit to operate in a predefined or permitted mode of operation. For example, a communication mode may be determined by a rate of data transmission, otherwise referred to as a data rate. Many subscriber units change data rates according to voice activity. Other subscriber units may change data rates in response to a user request for a different level of communication service. Such service levels may include one data rates suited for email, and another for browsing the internet.

Alternatively, a communication mode may be determined by a number of communication channels between the subscriber unit and the communication system infrastructure, wherein a channel may be defined as an independently processed or coded data stream. A user may want to use more than one channel to increase the data rate between the subscriber unit and the infrastructure. In some configurations voice may be transmitted on one channel and data on another. Other configurations may aggregate the data rate of each channel to effectively form one high data rate channel. Of particular relevance to this invention are communication modes that set subscriber unit configurations that have different transmit power requirements.

In order to determine the current communication mode, the process preferably examines registers in a transmit control circuit wherein such registers are responsible for configuring a transmitter, including a data modulator, in the subscriber unit.

In order to determine power margin requirements for the current communication mode, the process may perform a lookup operation from memory, wherein the memory may be coupled to the transmit control for storing various power margin requirements associated with various communication modes. Power margin requirements are typically proportional to the power requirement for the associated communication mode. For example, voice transmission with a data rate of 9600 baud may require a power margin of 5 dB, while data communication in a communication mode that uses two traffic channels may require a power margin of 8 dB. In a preferred embodiment, the power margin requirement is a range of transmit power that is desired for optimal power control in a particular communication mode. Power margin requirements may be different for voice (or other real time data) communication modes compared to data communication modes because there is usually not time available to retransmit erroneous voice data, while time is usually available to retransmit erroneous data packets.

Next, the process estimates a current communication mode quality in response to the power margin requirement for the current communication mode and the power margin, as illustrated at block 28. In a preferred embodiment, the communication mode quality may be represented as the excess, in dB, of the power margin over the power margin requirement for the current communication mode. That is, the result of subtracting the power margin dB from the power margin requirement dB. Note that in some communication modes the power margin requirement may be 0 dB. If this is the case, the communication mode quality is equal to the power margin.

After the communication mode quality has been estimated, the subscriber unit may optionally send a message to the communications system infrastructure indicating the communication mode quality, as depicted at block 30. The subscriber unit may wish to send this message if the infrastructure has the capability of making adjustments so that communication mode quality at the subscriber unit may be improved.

Next, the process detects a request for a next communication mode in the subscriber unit, as illustrated at block 32. Such a request may be initiated by a subscriber unit user when, for example, the user wants to transmit data rather than voice, or data in addition to voice. The request may also be automatically generated within the subscriber unit when a need arises to transmit voice data or user data at a different data rate. Different data rates may be needed for different voice activity levels or for different levels of service in transferring user data.

After detecting a request for a next communication mode, the process determines the power margin requirement for the next communication mode, as depicted at block 34. This step may be implemented by accessing a table in memory that stores power margin requirements associated with various communication modes.

Next, the process estimates the next communication mode quality in response to the next communication mode power margin requirement and the power margin, as illustrated at block 36. The estimate of the next communication mode quality is calculated in a manner similar to that described with reference to block 28.

After estimating the next communication mode quality, the process determines whether or not the estimated next communication mode quality falls below a quality threshold for the next communication mode, as depicted at block 38. If the estimated quality does not fall below the quality threshold, the process grants the request and changes the subscriber unit to the next communication mode, as illustrated at block 40. Thereafter, the process iteratively returns to block 22.

If, however, the next communication mode quality falls below the quality threshold, the process denies the request for a change to the next communication mode, as depicted at block 42. A request may be denied when, for example, the subscriber unit desires to transmit data at a higher rate and the current power margin, along with the power margin required for the higher rate, will not support transmission at the higher rate. In this manner, a user or a subscriber unit that automatically request the services provided by a next communication mode may be denied a change to the next communication mode.

After denying the request for the change to the next communication mode, the process may send a message from the subscriber unit to the communication system infrastructure that indicates the change to the next communication mode has been denied, as illustrated at block 44. Such a message may be used by the system operator as an indication of system performance.

If the infrastructure has the ability to make adjustments to improve the communication mode quality, such adjustments may be made in response to the denial message. For example, the infrastructure could reduce service or take away multiple channels for other users in an effort to provide more service to the user that has been denied a change to the next mode. Also, if the infrastructure can steer an antenna beam pattern toward the user requesting a mode change, the communication mode quality may be increased to a level that permits operating in the requested mode other such infrastructure adjustments are possible to increase communication mode quality. A priority of the user may also be considered when deciding to make the adjustments.

If the location of a subscriber unit that has denied a change to a next communication node is known, the message may also indicate the location. The message and location data may be combined to show an operator which locations in the service area have problems with certain communication modes. Once these locations are known to the operator, the operator may take corrective action by changing the operation of the communications system, or perhaps by adding new equipment to improve system operation or capacity.

Note that the communication mode quality may also be used to determine whether or not the subscriber unit should backoff to a communication mode that requires a smaller power margin. For example, if the next communication mode is one level lower in power margin requirement, the subscriber unit may still deny the change to a lower level power margin requirement if the communication mode quality falls below the threshold. The subscriber unit may respond to this denial by requesting a change to a next communication mode that is two levels lower in power margin requirement, wherein the communication mode two levels down has an estimated communication mode quality that exceeds the minimum threshold.

Figure 2:
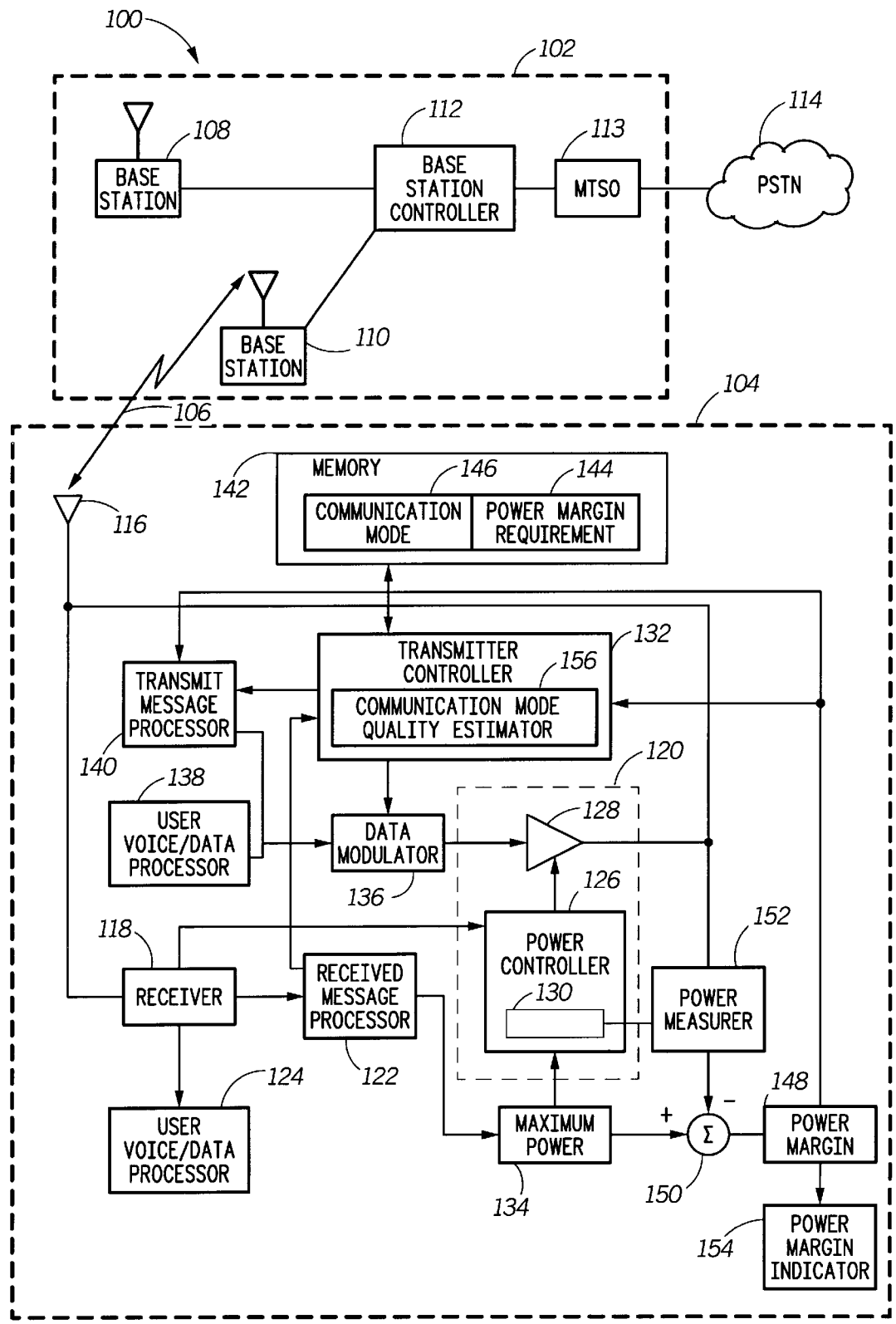
FIG. 2 is a high-level block diagram of a system which may be used to implement the present invention.

With reference now to FIG. 2, there is depicted a wireless communication system which may be used to implement the method and system of the present invention. As illustrated, wireless communication system 100 includes communication system infrastructure 102 and subscriber unit 104, which make up the two major components in the system. Communication system infrastructure 102 and subscriber unit 104 communicate via air interface 106. In a preferred embodiment, wireless communication system 100 is a CDMA system, or other system that uses power control.

Communication system infrastructure 102 may include base stations 108 and 110, which are coupled to base station controller 112. Generally, base station controller 112 controls many aspects of the wireless communication system such as allocating subscribers to the proper cell (handoff), performing call set-up, call supervision, and call termination. Base station controller 112 is also responsible for placing base stations 108 and 110 in various communication modes in order to communicate with subscriber unit 104.

Base station controller 112 is also coupled to public switched telephone network (PSTN) 114 via mobile telephone switching office (MTSO) 113 so that subscriber unit 104 can place a telephone call to a wireline telephone.

Subscriber unit 104 receives and transmits signals via air interface 106 using antenna 116. Antenna 116 is coupled to the input of receiver 118 and the output of power amplifier 120. Receiver 118 down converts and demodulates information or data sent from communication system infrastructure 102.

Data output by receiver 118 is selectively coupled to power amplifier 120, received message processor 122 and user voice/data processor 124. Information sent from receiver 118 to power amplifier 120 may include power control bits that increment or decrement the power output by power amplifier 120. In some embodiments, data that represents absolute power control settings, or particular power management modes of operation, may be sent from receiver 118 to power amplifier 120. Note that power amplifier 120 includes power controller 126, which is preferably implemented with digital circuitry that controls the operation of analog circuits in amplifier 128. Power controller 126 may include register 130 for storing a value that controls the power output of amplifier 128.

Receiver 118 sends messages that control the operation of subscriber unit 104 to received message processor 122. Such received messages may include messages that direct subscriber unit 104 to operate in a particular communication mode. Therefore, in order to implement a selected communication mode, received message processor may send data to transmitter controller 132, maximum power register 134, and other circuits within subscriber unit 104 that receive messages to control communication modes.

User voice/data processor 124 is used to turn voice data back into analog voice signals, or to process user data, such as data from the internet or a file transfer. Thus, user voice/data processor 124 handles data that is considered "payload data."

Transmitter controller 132 is responsible for controlling the transmitter side of subscriber unit 104, which includes operating the transmitter in various communication modes.

As illustrated, transmitter controller 132 is coupled to data modulator 136, user voice/data processor 138, transmit message processor 140, and memory 142. The selection of a communication mode may be executed in response to messages from communication system infrastructure 102 as processed by received message processor 122, in response to requests from the user, or in response to other conditions within subscriber unit 104.

User voice/data processor 138, processes payload data, or traffic channel data, which will be transmitted to communication system infrastructure 102. Such data may include digitized voice data or other data.

Transmit message processor 140 processes command and control data collected or generated in subscriber unit 104. Messages processed here include requests from the user, measurements made in the subscriber unit, and other status indicators relating to the operation of subscriber unit 104.

Data modulator 136 receives inputs from transmit message processor 140 and user voice/data processor 138 and formats and modulates these inputs so that they may be amplified by power amplifier 120 and transmitted to communication system infrastructure 102. Data modulator 136 may include, interleaving, coding, and radio frequency modulation functions. Among other things, memory 142 stores data that represents power margin requirements 144 that are associated with various communication modes 146.

According to an important aspect of the present invention, power margin value 148 is calculated by summer 150, which, in preferred embodiment, subtracts a current power measurement provided by power measurer 152 from a maximum power value 134. Power margin value 148 represents an amount of additional power subscriber unit 104 may transmit. That is, an amount of power in excess of the power currently being transmitted.

Power margin value 148 may be indicated to the user by power margin indicator 154. Such an indicator may be placed on subscriber unit 104 and implemented with any suitable display or indicator technology, such as light emitting diodes, a meter, a liquid crystal display, or the like. Power margin indicator 154 may also be implemented with an audible signal indicator. The user may use the power margin indication to find a desirable location or orientation for subscriber unit 104 to efficiently communicate with infrastructure 102.

As indicated in FIG. 2, power margin 148 may be communicated to transmit controller 132 and transmit message processor 140. Within transmitter controller 132, communication mode quality estimator 156 may be used to calculate a communication mode quality.

Transmitter controller 132 may also deny a request to change to a next communication mode in response to the communication mode quality, which is a function of the current power margin and power margin requirement 144 associated with the next communication mode 146. Additionally, the current power margin 148, or communication mode quality, may be processed by transmit message processor 140 and communicated to communication system infrastructure 102. As described above, communication system infrastructure 102 may respond in a way that increases the subscriber unit's communication mode quality or power margin.

Figure 3:
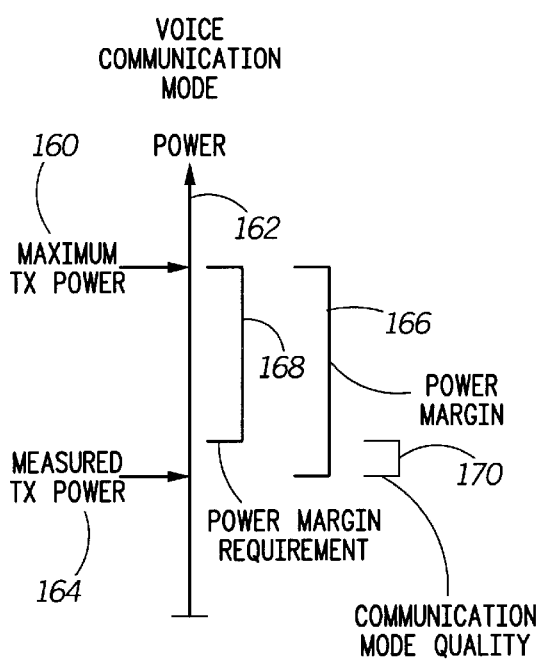
FIGS. 3 and 4 depict graphical representations of relationships between power measurements, power margin requirements, measured power margins, and communication mode quality levels in accordance with the method and system of the present invention.
Figure 4:
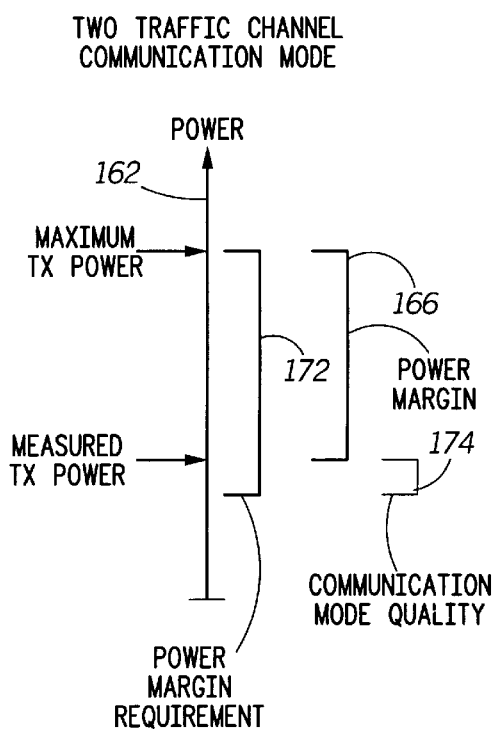

With reference now to FIGS. 3 and 4, there are depicted graphical representations of relationships between power measurements, power margin requirements, measured power margins, and communication mode quality levels.

As shown in FIG. 3 for a voice communication mode, maximum transmit power 160 has been indicated on power scale 162. Maximum transmit power 160 may be set by the power-handling capability of the components in amplifier 128 (see FIG. 2). Alternatively, maximum transmit power 160 may be set by a value, which may be from a received command related to a current communication mode.

Measured transmit power is indicated on power scale 162 as shown at reference numeral 164. As mentioned above, transmit power measurements may be made directly at the output of amplifier 128 or indirectly by reading a value in a register that controls transmit power, such as register 130 (see FIG. 2).

Power margin 166 is shown with a magnitude equal to the difference between maximum transmit power 160 and measured transmit power 164. Power margin requirement 168 represents a power margin desired for the current communication mode, which in FIG. 3 is the voice communication mode. As may be seen from the diagram, power margin 166 exceeds power margin requirement 168. Communication mode quality 170 may be calculated by subtracting power margin requirement 168 from power margin 166. In the communication mode shown in FIG. 3, communication mode quality 170 is a positive number, which is a desired mode of operation.

With reference now to FIG. 4, a graph for a two traffic channel communication mode is illustrated. As may be seen, the two traffic channel communication mode requires a larger power margin, as shown at reference numeral 172. With all other measurements and settings being equal to those shown in FIG. 3, power margin 166 in this mode falls below power margin requirement 172, which is an undesirable mode of operation. If the subscriber unit were to change from the voice communication mode illustrated in FIG. 3 to the two traffic channel communication mode illustrated in FIG. 4, degraded service may be expected, if permission to change to the two traffic channel communication mode is granted at all. Also note that communication mode quality 174, which is calculated by subtracting power margin requirement 172 from power margin 166, is a negative number, which is an indication of an undesirable mode of operation.

Because in some communication systems the reverse link capacity is more sensitive than the capacity of the forward link, the present invention is useful in determining when a new user may obtain access to the system or when an existing user may increase transmitted power to operate in a communication mode with a higher level of service. This type of determination is best made by examining a communication mode quality that considers the reverse link power margin of the current system users.

The foregoing description of a preferred embodiment of the invention has been presented for the purpose of illustration and description. It is not intended to be exhaustive or to limit the invention to the precise form disclosed. Modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for estimating a communication mode quality for a subscriber unit in a wireless communication system service area, the method comprising the steps of:

determining a subscriber unit transmit power;

subtracting the subscriber unit transmit power from a maximum transmit power to determine a power margin;

determining a current communication mode; and estimating the communication mode quality in response to a predetermined power margin requirement of the current communication mode and the power margin.

2. The method for estimating a communication mode quality according to claim 1 wherein the communication mode quality is directly proportional to the power margin.

3. The method for estimating a communication mode quality according to claim 1 wherein a current communication mode further includes a communicating mode having a selected data rate.

4. The method for estimating a communication mode quality according to claim 1 wherein a current communication mode further includes a communication mode that uses more than one traffic channel.

5. The method for estimating a communication mode quality according to claim 1 further including the step of indicating the power margin.

6. The method for estimating a communication mode quality according to claim 1 further including the steps of:

detecting a request for a change to a next communication mode;

estimating a next communication mode quality in response to a predetermined power margin requirement of the next communication mode and the power margin; and denying the change to the next communication mode if the estimated next communication mode quality is below a predetermined threshold.

7. The method for estimating a communication mode quality according to claim 6 further including the step of reporting to a wireless communication system infrastructure that the subscriber unit denied a change to the next communication mode.

8. The method for estimating a communication mode quality according to claim 7 further including the step of making adjustments at the infrastructure in response to the reporting that the subscriber unit denied a change to the next communication mode.

9. A system for estimating a communication mode quality for a subscriber unit in a wireless communication system service area comprising:

means for determining a subscriber unit transmit power;

means for subtracting the subscriber unit transmit power from a maximum transmit power to determine a power margin;

means for determining a current communication mode; and means for estimating the communication mode quality in response to a predetermined power margin requirement of the current communication mode and the power margin.

10. The system for estimating a communication mode quality according to claim 9 wherein the communication mode quality is directly proportional to the power margin.

11. The system for estimating a communication mode quality according to claim 9 wherein a current communication mode further includes a communication mode having a selected data rate.

12. The system for estimating a communication mode quality according to claim 9 wherein a current communication mode further includes a communication mode that uses more than one traffic channel.

13. The system for estimating a communication mode quality according to claim 9 further including means for indicating the power margin.

14. The system for estimating a communication mode quality according to claim 9 further including:
   means for detecting a request for a change to a next communication mode;
   means for estimating a next communication mode quality in response to a predetermined power margin requirement of the next communication mode and the power margin; and
   means for denying the change to the next communication mode if the estimated next communication mode quality is below a predetermined threshold.

15. The system for estimating a communication mode quality according to claim 14 further including means for reporting to a wireless communication system infrastructure that the subscriber unit denied a change to the next communication mode.

16. The system for estimating a communication mode quality according to claim 15 further including means for making adjustments at the infrastructure in response to the reporting that the subscriber unit denied a change to the next communication mode.

17. A system for estimating a communication mode quality in a subscriber unit of a wireless communications system comprising:

a power amplifier;

a power measurer coupled to the power amplifier for providing a power measurement;

a maximum power indicator for providing a maximum power value, wherein the maximum power value limits the output power of the power amplifier;

a summer for subtracting the power measurement from the maximum power value to calculate a power margin; and a communication mode quality estimator for estimating a communication mode quality in response to the power margin.

18. The system for estimating a communication mode quality in according to claim 17 further comprising a power margin indicator for indicating the power margin.

19. The system for estimating a communication mode quality in according to claim 17 wherein the power measurer is coupled to the output of the power amplifier for providing a power measurement.

20. The system for estimating a communication mode quality in according to claim 17 wherein the power measurer is coupled to a register in a power controller of the power amplifier for providing a power measurement.

* * * * *